United States Patent [19]
Gretz

[11] Patent Number: 6,102,442
[45] Date of Patent: Aug. 15, 2000

[54] WATERLIGHT FITTING FOR FLEXIBLE CONDUIT

[75] Inventor: Thomas J. Gretz, Clarks Summit, Pa.

[73] Assignee: Arlington Industries, Inc., Scranton, Pa.

[21] Appl. No.: 09/329,440

[22] Filed: Jun. 10, 1999

Related U.S. Application Data

[63] Continuation-in-part of application No. 08/681,070, Jul. 22, 1996, Pat. No. 6,044,868, which is a continuation of application No. 08/394,400, Feb. 24, 1995, abandoned.

[51] Int. Cl.[7] ............................................. F16L 35/00
[52] U.S. Cl. ......................... 285/40; 285/39.1; 285/251; 285/422; 285/423
[58] Field of Search .................... 285/40, 422, 92, 285/139.1, 423, 382, 251; 138/109

[56] References Cited

U.S. PATENT DOCUMENTS

| | | | |
|---|---|---|---|
| 2,484,192 | 10/1949 | Squiller | 285/40 |
| 2,580,818 | 1/1952 | Mundy et al. | 285/40 |
| 3,992,044 | 11/1976 | Muslin | 285/92 |
| 4,457,544 | 7/1984 | Snow et al. | 285/92 |
| 5,240,291 | 8/1993 | Zornow | 285/40 |

*Primary Examiner*—Dave W. Arola

[57] ABSTRACT

The present invention describes an improved connector for attaching flexible metallic and non-metallic conduit to electrical panel or junction boxes. The improved connector comprises a two pieces. The first piece comprises a metallic cylindrical inner body section, having an integral collar extending from the metallic cylindrical inner body section. The outer circumference of the inner body section has threads at one end thereof for grabbing the interior surface of the flexible conduit and pulling it toward the collar, while the other end of the metallic cylindrical inner body is equipped with external threads for engagement with an electrical panel or junction box. The second piece comprises a non-metallic resilient seat member or ferrule friction fit onto the conduit engaging end of the metallic cylindrical inner body that is engaged by the conduit end as the conduit is threaded onto the cylindrical inner body.

8 Claims, 3 Drawing Sheets

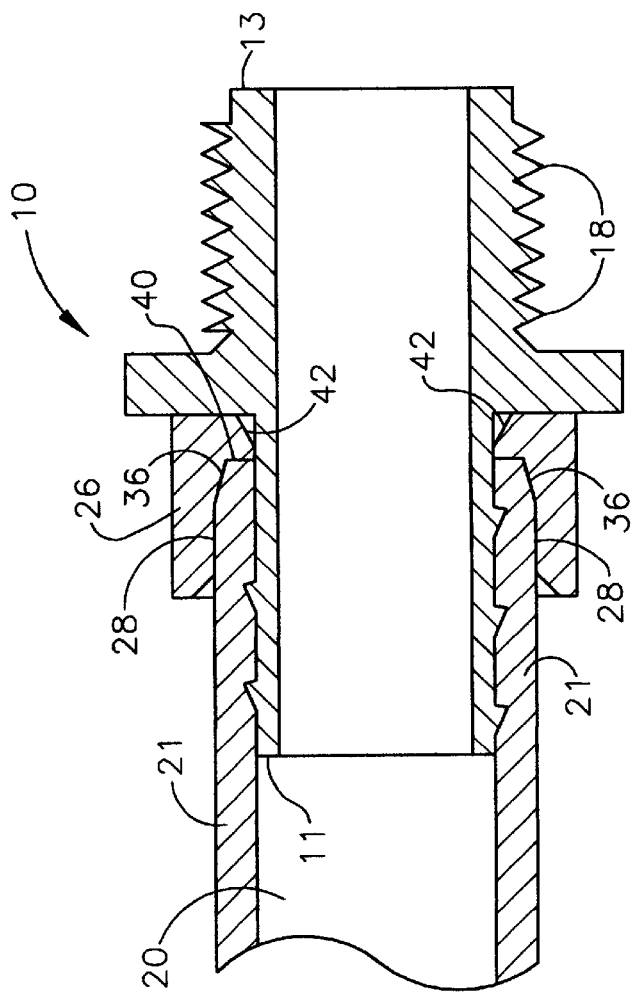
FIG. 6
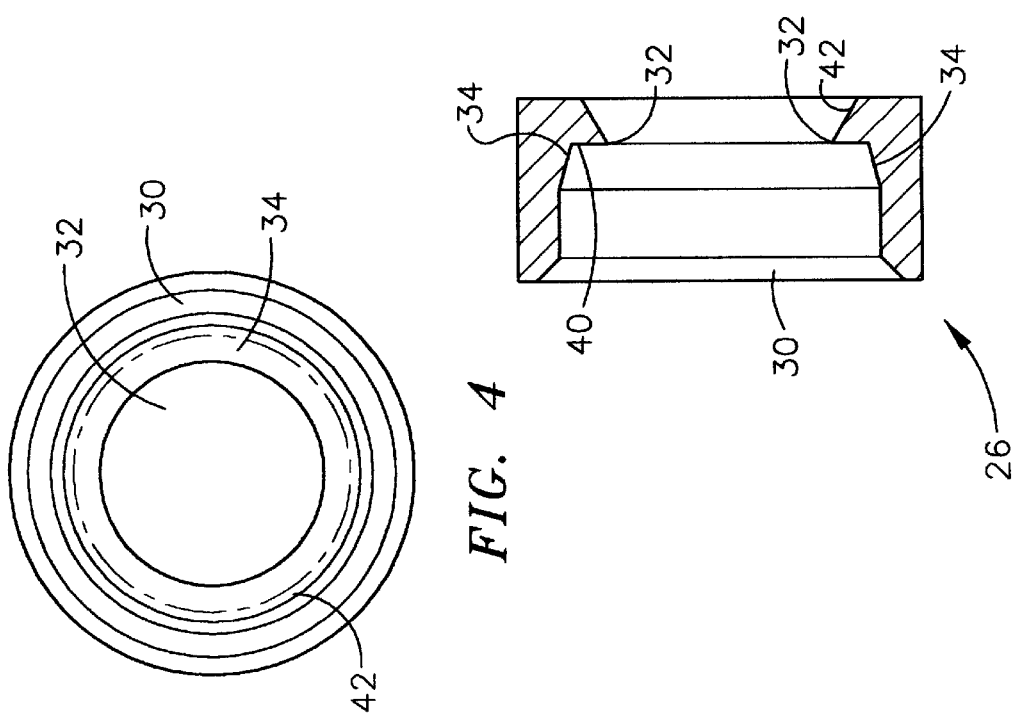
FIG. 5
FIG. 4

WATERTIGHT FITTING FOR FLEXIBLE CONDUIT

This application is a continuation-in-part of U.S. patent application Ser. No. 08/681,070, filed Jul. 22, 1996, now U.S. Pat. No. 6,044,868, which was in turn a continuation of U.S. patent application Ser. No. 08/394,400, filed Feb. 24, 1995 and now abandoned.

FIELD OF THE INVENTION

The present invention relates to devices for connecting flexible metallic or non-metallic conduit to electrical panels or boxes and more specifically to an improved such connector that is easy to manufacture, and creates a watertight seal without the use of a separate gasket.

BACKGROUND OF THE INVENTION

Most prior art liquid tight connectors for either flexible metallic or non-metallic conduit require the use of a gasket where the connector contacts the conduit to insure watertightness, especially in those cases where the end of the conduit has not been cut perfectly square prior to attachment to the connector. In such instances, the separate gasket provides a flexible seal against which anomalies in the contacting surfaces of the unevenly cut conduit can be sealed by butting contact.

U.S. Pat. No. 4,457,444 to Snow et al issued Jul. 3, 1984 describes a connector for a liquid tight, flexible electrical conduit formed of a plurality of interlocking, thin, arcuate metal sections having an interior wall of alternating ridges and grooves. The connector includes a ferrule end insertable into the conduit with a plurality of spatially separated arcuate segments matching the conduit grooves for threadable engagement. A resilient seat member, snug fit onto the ferrule end is engaged by the conduit end as the conduit is threaded onto the ferrule to sealingly terminate the full perimeter edge of the conduit end, thereby enabling the conduit and connector assembly to be liquid tight. One or more ramp formed barbs are provided on one or more of the ferrule arcuate segments to lock and secure the connector on the conduit. While this connector is very useful with so-called "armored" metallic conduit, its design does not permit its successful use with flexible non-metallic and a variety of other types of flexible metallic conduits that include, for example, a polymeric waterproofing layer as an integral portion of the flexible conduit. Such conduits are often referred to as Greenfield conduit and include a PVC covering to prevent water intrusion.

OBJECT OF THE INVENTION

It is therefore an object of the present invention to provide a watertight connector for connecting either metallic or non-metallic flexible conduit to electrical panel or junction boxes without the need for a gasket and without differentiation between metallic and non-metallic conduit.

SUMMARY OF THE INVENTION

According to the present invention there is provided an improved connector for attaching flexible metallic and non-metallic conduit to electrical panel or junction boxes. The improved connector comprises a two pieces. The first piece comprises a metallic cylindrical inner body section, having an integral collar extending from the metallic cylindrical inner body section. The outer circumference of the inner body section has threads at one end thereof for grabbing the interior surface of the flexible conduit and pulling it toward the collar, while the other end of the metallic cylindrical inner body is equipped with external threads for engagement with an electrical panel or junction box. The second piece comprises a non-metallic resilient seat member or ferrule friction fit onto the conduit engaging end of the metallic cylindrical inner body that is engaged by the conduit end as the conduit is threaded onto the cylindrical inner body.

DESCRIPTION OF THE DRAWINGS

FIG. 4 is an end view of the ferrule of the connector of the present invention.

FIG. 5 is a cross-sectional view of the ferrule of the connector of the present invention.

FIG. 6 is a cross-sectional view showing the connector of the present invention with a flexible non-metallic conduit attached thereto.

DETAILED DESCRIPTION

The present invention comprises a connector for attaching metallic or non-metallic conduit to electrical panels, junction boxes, motors and other electrical devices.

Figure 3:
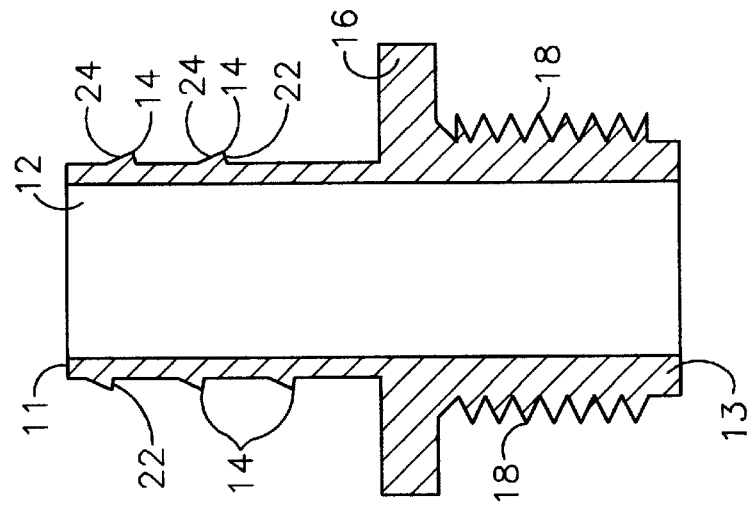
FIG. 3 is a cross-sectional view of the connector of the present invention showing the inner tubular body, the hexagonal collar, and threads at either end of the inner tubular section.
Figure 2:
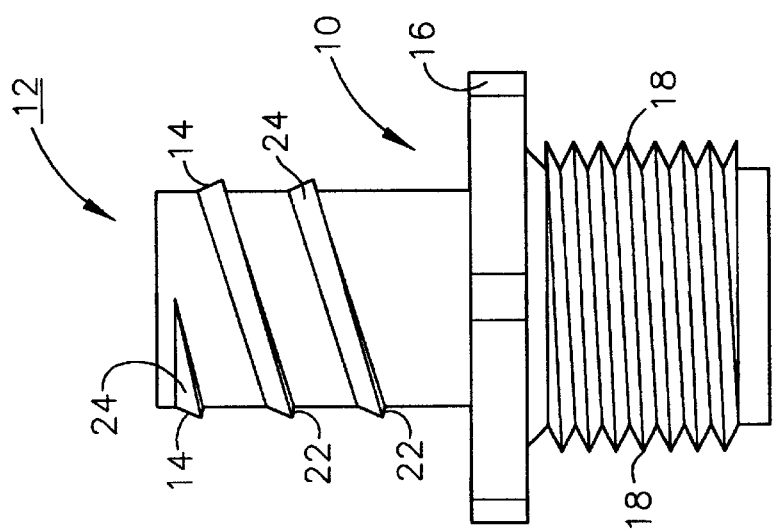
FIG. 2 is a side view of the connector of FIG. 1.
Figure 1:
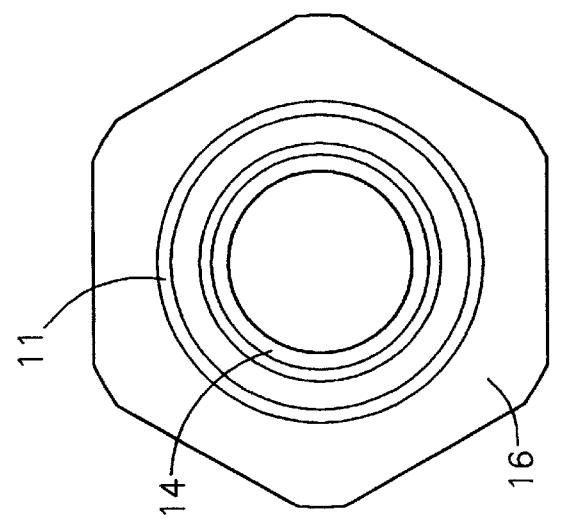
FIG. 1 is a top view of the connector of the present invention showing the tubular inner body, the hexagonal collar, and the ferrule.

As shown in FIGS. 2 and 6, the connector of the present invention comprises a resilient ferrule 26 frictionally or snug fit about a metallic cylindrical or tubular inner body 12, having 1) a smooth inside surface or bore therethrough, 2) conduit threads 14 about its circumference at one end 11 thereof, 3) a collar 16 proximate the center thereof, and 4) attachment threads 18 about the circumference of inner body 12 at end 13 opposite end 11. Collar 16 has a hexagonal outer surface to permit engagement with a wrench or other similar tool for tightening the connector as described hereinafter.

As shown in FIG. 2, conduit threads 14 begin near exterior end 11 of connector 10 of inner body 12. The shape and pitch of the conduit threads are critical to the successful practice of the resent invention, as they create a pulling or self-threading action on shell 21 of flexible metallic or non-metallic conduit 20 as it is rotated firmly onto the end of inner body 12 as described below. Conduit threads 14 typically have a pitch of 5 threads per inch and an angle of from about 10° about 30° on surface 22 that faces away from end 11. The angle of conduit threads 14 on their front side 24, i.e. the side facing end 11, is preferably about 60°. It is this shape and pitch of conduit threads 14 that produce the aforementioned self-threading action of conduit shell 21 on inner body 12 as shown in FIG. 6. Threads 18 at interior end 13 about the circumference of inner body 12 facilitate connection to a panel box, junction box, motor or other similar device, as described in connection with FIG. 6 below. Inner body 12 is preferably fabricated from a metal to provide the electrical grounding necessary when a flexible metallic conduit is connected using the connector of the present invention. Cast zinc alloys of the type conventionally used in such applications is preferred.

Resilient ferrule 26 depicted in FIG. 5 is of a generally cylindrical shape. Diameter 30 of resilient ferrule 26 that faces end 11 of inner body 12 when installed on inner body 12 is larger than diameter 32 that is of a slightly smaller diameter than the outer circumference of inner body 12 so as to fit snugly thereover when installed as shown in FIG. 6. The difference between diameters 30 and 32 is partially accommodated by taper 34 that ends at abutment 40. Having this structure, when resilient ferrule 26 is installed over end 11 of inner body 12, as shown in FIG. 6, it provides a channel 28 between the inner surface of ferrule 26 and the outer circumference of inner body 12. Taper 34 and abutment 40, in this configuration, create a restricted space 36 at the end of channel 28. A critical element of ferrule 26 is the presence of reverse taper 42 at the end of ferrule 26 that abuts collar 16 in the installed configuration depicted in FIG. 6. The presence of reverse taper 42 in resilient ferrule 26 permits additional deformation of resilient ferrule 26 at the point of maximum criticality to insure a water-tight seal as will be described hereinafter. Reverse taper 42 is preferably at an angle of about 45°. Resilient ferrule 26 may be fabricated of any suitable resilient and water-resistant material. Generally, a polymeric material such as PVC, polyethylene or polypropylene that is easily fabricated and highly resilient has been found suitable for such use. Typically, resilient ferrule 26 is fabricated from co-extruded polyvinyl chloride. A combination of rigid polyvinyl chloride co-extruded with flexible polyvinyl chloride has been found most suitable.

FIG. 6 depicts a cross-sectional side view of connector 10 of the present invention with a flexible non-metallic water-tight conduit 20 inserted fully therein. As conduit 28 is contacted with the exterior end 11 of the connector and firmly rotated against inner body 12, it begins to advance on the outer circumference of inner body 12. Conduit threads 14 form a path or groove in the interior surface of shell 21. Further rotation of conduit 20 with respect to connector 10 causes further advancement of conduit 20 along inner body 12. This advancing action of conduit shell 21 is facilitated by the shape and pitch of conduit threads 14 that create the necessary pulling action to draw conduit shell 21 into channel 28.

To aid the entry of conduit shell 21 into channel 28, the outer diameter of inner body 12 is slightly less than the inner diameter of conduit shell 21 and the inner diameter 30 of ferrule 26 is slightly larger than the outer diameter of conduit shell 21. The outer diameter of conduit threads 14 is slightly greater than the inner diameter of conduit shell 21 to enable the conduit threads 14 to dig into the inner wall of conduit shell 21 and create the required pulling and guiding action as conduit 20 is rotated with slight force onto inner body 12. As inner diameter 32 of taper 42 is slightly less than the outer diameter of conduit shell 21 the inserted end of conduit shell 21 is thereby compressed inwardly toward the central axis of inner body 12 and further forced against conduit threads 14. Simultaneously, the very end of conduit shell 21 is forced against abutment 40 of ferrule 26. In this compressed state, conduit shell 21 forms a watertight seal between inner body 12 and ferrule 26 in channel 28. The presence of reverse taper 42 permits additional deformation of resilient ferrule 26 as conduit shell 21 advances against abutment 40 as further insurance that connector 10 does not leak. This additional deformation is particularly important when the end of conduit shell 21 has net been squarely or evenly cut. The ability abutment 40 of resilient ferrule 26 to deform differently and selectively about the periphery of conduit shell 21 by virtue of the presence of reverse taper 42 to accommodate variations in the cut end of conduit shell 21 can e critically important to insuring a water-tight seal. In the fully installed configuration depicted in FIG. 6, conduit 20 is very resistant to being dislodged by a backward pulling force. The compression of conduit shell 21 against conduit threads 14 provides a retention force that is difficult to overcome.

Figure 7:
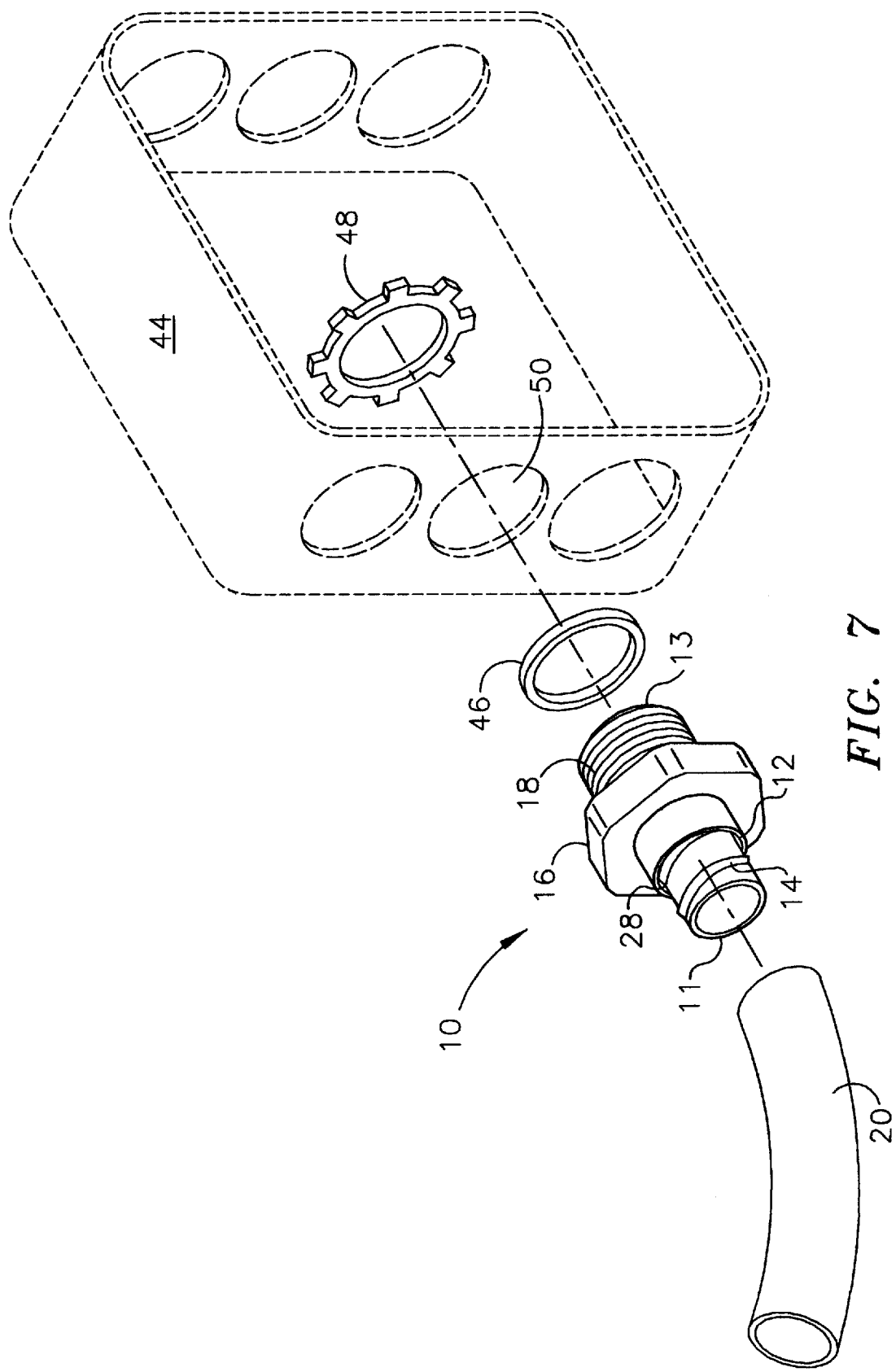
FIG. 7 is a blown apart perspective view of the connector of the present invention, a flexible non-metallic conduit, a junction box and a gasket and lock nut for affixing the connector of the present invention to the junction box as they would be aligned for assembly.

FIG. 7 shows and exploded perspective view of the various pieces that would be fitted together to attach connector 10 of the present invention to a typical junction box. From left to right in FIG. 6 are shown conduit 20, connector 10, gasket 46, junction box 44 and lock nut 48. A typical sequence for installing connector 10 would include: 1) trimming conduit shell 21 to an appropriate length; 2) inserting conduit 20 into inner body 12; 3) rotating conduit shell 21 upon inner body 12 until the end of conduit shell 21 is locked in a compressed state within channel 28; 4) sliding gasket 46 upon and over threads 18 on the interior end 13 of inner body 12; 5) inserting end 13 of inner body 12 with the gasket thereon into access hole 50 in junction box 44; 6) screwing lock nut 48 onto threads 18; and 7) tightening lock nut 48 until a water sight seal is created by compressed gasket 46 between connector 10 and the exterior surface of junction box 44.

As the invention has been described, it will be apparent to those skilled in the art that the same may be varied in many ways without departing from the spirit and scope of the invention. Any and all such modifications are intended to be included within the scope of the appended claims.

What is claimed is:

1. A two-piece water tight connector for flexible metallic and nonmetallic conduit having a conduit shell comprising:
    a) a generally cylindrical inner body having a smooth bore therethrough, an interior end, an exterior end and an outer surface;
    an integral collar extending radially from said outer surface between said interior and exterior ends;
    integral conduit threads extending about the periphery of said exterior end, said threads being of such a shape and pitch as to create a pulling action on an appropriately sized flexible conduit threaded thereon; and
    b) a non-metallic resilient ferrule frictionally fit about said exterior end of said inner body and abutting said integral collar;
    said non-metallic resilient ferrule having a first diameter in the area facing said exterior end slightly greater than the outside diameter of said conduit shell, a second diameter at the interior of said non-metallic resilient ferrule slightly smaller than the outer diameter of said inner body and sealing engaging said inner body, a third diameter larger than said second diameter where said non-metallic resilient ferrule abuts said collar, and a first taper in the area where said first diameter reduces to said second diameter, said first diameter and said first taper in combination with said outer surface of said inner body defining a channel into which said conduit shell is compressed when said conduit it rotatably applied to said inner body by engagement of said conduit threads with said conduit shell.

2. The watertight connector of claim 1 further including a reverse taper in the area where said second diameter increases to said third diameter.

3. The watertight connector of claim 2 further including at said interior end threads on said outer surface for engaging a lock nut.

4. The watertight connector of claim 2 wherein said reverse taper is about 45°.

5. The watertight connector of claim 2 wherein said inner body is fabricated from a zinc alloy.

6. The water tight connector of claim 2 wherein said non-metallic resilient ferrule is fabricated from a polymeric material selected from the group consisting of polyvinyl chloride, polyethylene, polypropylene, and co-extruded mixtures of rigid and flexible polyvinyl chloride.

7. The water tight connector of claim 2 wherein said conduit threads have a sharp slope on the sides of said threads facing said interior end, a gradual slope on the sides of said threads facing said exterior end, and a pitch of about 5 threads per inch.

8. The watertight connector of claim 7 wherein said sharp slope ranges from about 10° to about 30° and said gradual slope is about 60°.

* * * * *